United States Patent
Wan et al.

(10) Patent No.: US 9,455,805 B2
(45) Date of Patent: Sep. 27, 2016

(54) METHOD AND APPARATUS FOR WIRELESS COMMUNICATIONS

(71) Applicant: HUAWEI TECHNOLOGIES CO., LTD., Shenzhen (CN)

(72) Inventors: Lei Wan, Beijing (CN); Yang Li, Beijing (CN); Xiaobo Chen, Beijing (CN); Lei Guan, Beijing (CN); Chaojun Li, Beijing (CN); Qiang Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 79 days.

(21) Appl. No.: 14/335,165

(22) Filed: Jul. 18, 2014

(65) Prior Publication Data

US 2014/0328283 A1    Nov. 6, 2014

Related U.S. Application Data

(63) Continuation of application No. PCT/CN2012/085032, filed on Nov. 22, 2012.

(30) Foreign Application Priority Data

Jan. 18, 2012 (CN) .......................... 2012 1 0016308

(51) Int. Cl.
*H04L 5/00* (2006.01)
*H04W 28/18* (2009.01)
*H04L 5/14* (2006.01)

(52) U.S. Cl.
CPC .............. *H04L 5/0003* (2013.01); *H04L 5/14* (2013.01); *H04W 28/18* (2013.01)

(58) Field of Classification Search
CPC ....... H04L 5/0003; H04L 5/14; H04W 28/18
See application file for complete search history.

(56) References Cited

U.S. PATENT DOCUMENTS 5,970,056 A   10/1999   Brailean et al.
7,817,641 B1  10/2010   Khandani
(Continued)

FOREIGN PATENT DOCUMENTS

CN   101212243 A   7/2008
CN   101212249 A   7/2008
(Continued)

OTHER PUBLICATIONS

"On support of different TDD UL-DL configurations on different bands"; R1-113674; 3GPP TSG-RAN WG1 #67; San Francisco, Nov. 14-18, 2011 (7 pages).
(Continued)

*Primary Examiner* — Paul H Masur
(74) *Attorney, Agent, or Firm* — Staas & Halsey LLP

(57) ABSTRACT

The present invention discloses a method and an apparatus for wireless communications, which relate to the field of communications and are used to solve the problem of a relatively low communication quality in the advanced full duplex communication technology. The method provided in the present invention includes: dividing available radio resources in a communication system into first radio resources and second radio resources, where the first radio resources and the second radio resources occupy different radio resources; simultaneously performing bidirectional transmission of communication information with a user equipment through the first radio resources; and performing unidirectional transmission of communication information with the user equipment through the second radio resources. The present invention is applicable to the field of communications and used for wireless communications.

18 Claims, 5 Drawing Sheets

(56) References Cited

U.S. PATENT DOCUMENTS

| | | | |
|---|---|---|---|
| 2004/0258093 A1 | 12/2004 | Powell | |
| 2010/0074151 A1 | 3/2010 | Westerberg et al. | |
| 2011/0211503 A1* | 9/2011 | Che | H04L 5/0005 370/280 |
| 2011/0249548 A1* | 10/2011 | Gaal | H04J 13/0059 370/206 |
| 2013/0083704 A1* | 4/2013 | Gaal | H04L 5/001 370/277 |
| 2013/0301485 A1 | 11/2013 | Beale et al. | |

FOREIGN PATENT DOCUMENTS

| | | |
|---|---|---|
| CN | 101237275 A | 8/2008 |
| CN | 101237675 A | 8/2008 |
| CN | 101682396 A | 3/2010 |
| EP | 2237622 A1 | 8/2006 |
| KR | 10-2008-0053922 | 6/2008 |
| WO | WO 2009/098869 A1 | 8/2009 |

OTHER PUBLICATIONS

"*Discussion on HARQ feedback of TDD Inter-band Carrier Aggregation*"; R1-113951; 3GPP TSG-RAN WG1 #67; Nov. 14-18, 2011, San Francisco, USA (7 pages).

Japanese Office Action mailed Aug. 4, 2015 in related Japanese Patent Application No. 2014-552480 (5 pages) (5 pages English Translation).

Australian Office Action dated Oct. 7, 2015 in related Australian Patent Application No. 2012365903 (4 pages).

Korean Office Action dated Jun. 22, 2015 in related Korean Patent Application No. 10-2014-7022704 (4 pages) (3 pages English Translation).

Chinese Office Action dated Apr. 15, 2015 in corresponding Chinese Patent Application No. 201210016308.6.

Extended European Search Report dated Oct. 28, 2014 in corresponding European Patent Application No. 12865691.5 (8 pages).

PCT International Search Report and Written Opinion; Forms PCT/ISA/210, PCT/ISA/220 and PCT/ISA/237 dated Feb. 28, 2013 in corresponding PCT Application No. PCT/CN2012/085032 (12 pages).

"*Achieving Single Channel, Full Duplex Wireless Communication*"; Jung II Choi, Mayank Jain, Kannan Srinivasan, Philip Levis, Sachin Katti; Stanford University; MobiCom'10, Sep. 20-24, 2010, Chicago, Illinois, USA (12 pages).

*eNB knowledge of HD-FDD UE capability*; 3GPP TSG RAN WG2 #62, May 5-9, 2008, Kansas City, USA; R2-082245, R2-081898; Nortel; (3 pages).

"Summary of Relay email discussion [59-12-LTE-A]: Others", Agenda item: 7.5, Email discussion moderator, 3GPP TSG RAN WG1 Meeting #59bis, Valencia, Spain, Jan. 18-22, 2010, R1-100381.

Japanese Office Action issued May 10, 2016 in corresponding Japanese Patent Application No. 2014-552480.

\* cited by examiner

METHOD AND APPARATUS FOR WIRELESS COMMUNICATIONS

CROSS-REFERENCE TO RELATED APPLICATION

This application is a continuation of International Application No. PCT/CN2012/085032, filed on Nov. 22, 2012, which claims priority to Chinese Patent Application No. 201210016308.6, filed on Jan. 18, 2012, both of which are hereby incorporated by reference in their entireties.

TECHNICAL FIELD

The present invention relates to the field of communications, and in particular to a method and an apparatus for wireless communications.

BACKGROUND

With the popularity of smart phones and the rapid development of mobile Internet technologies, wireless broadband access technologies emerge endlessly. At present, a system for wireless communications mainly includes: an LTE system (Long Term Evolution, long term evolution), an LTE-A system (Long Term Evolution-Advanced, long term evolution-advanced), a 3G mobile communication system (3rd-Generation, 3rd-generation mobile communication system), and a WiMAX system (Worldwide Interoperability for Microwave Access, worldwide interoperability for microwave access). If bidirectional data transmission simultaneously performed on same radio resources is supported, data sending may cause serious interference on data receiving. Therefore, in the system for wireless communications, for specified radio resources, if both time domain resources and frequency domain resources of the radio resources are the same, only unidirectional transmission is allowed between a base station and a UE (User Equipment, user equipment), that is, on the same radio resources, the base station can only send downlink data to the UE, or receive uplink data sent by the UE. For example, in an FDD system (Frequency Division Duplexing, frequency division duplexing), different frequency domain resources are required for a base station to send downlink data to a UE and receive uplink data sent by the UE; and in a TDD system (Time Division Duplexing, time division duplexing), different time domain resources are required for a base station to send downlink data to a UE and receive uplink data sent by the UE.

Wireless spectrum resources are very scarce and expensive, and bidirectional data transmission cannot be simultaneously implemented on fixed spectrum resources in the existing communication system, causing a low utilization rate of the spectrum resources and low data throughput of the communication system. To improve the utilization rate of the spectrum resources, the academia puts forward an "advanced full duplex communication technology", where a certain technical means (for example, antennas are properly arranged on a component, so that signals from multiple transmitting antennas are eliminated by each other at a receiving antenna, or a known signal transmitted by a transmitting circuit is used in a receiving circuit to perform interference cancellation and the like) is adopted to reduce interference generated when a communication device simultaneously receives and sends signals, so that the communication device can implement bidirectional transmission of communication data, where the communication device includes a base station, a UE, and the like. It should be noted that the advanced full duplex communication here specifically refers to that: a base station and a UE can perform bidirectional data transmission on same time frequency resources.

During the implementation of the present invention, the inventor finds that the advanced full duplex communication technology has at least the following problems:

The communication device in the advanced full duplex communication technology adopts a certain technical means, so as to reduce interference generated when the communication device simultaneously receives and sends signals. As the communication system is gradually evolved, some common UEs exist in a network. Those common UEs do not support bidirectional transmission of communication data, which results in that the common UEs cannot normally transmit communication information using the advanced full duplex communication technology, and even cannot access the communication network. In another aspect, although the additional technical means is adopted to reduce the interference between receiving and sending of signals in the device, influences of the interference can be only reduced to a certain degree instead of being canceled completely, which reduces a gain that can be brought by the full duplex communication method, and as a result, multiple times of retransmission are required for successful transmission when an important signal is transmitted, and communication quality is reduced.

SUMMARY

Embodiments of the present invention provide a method and an apparatus for wireless communications, which can solve the problem that the advanced full duplex communication technology is incompatible with a UE of an old version and has a relatively low communication quality.

In order to achieve the objective, the embodiments of the present invention adopt the following technical solutions:

According to one aspect, an embodiment of the present invention provides a method for wireless communications, including:

dividing available radio resources in a communication system into first radio resources and second radio resources, where the first radio resources and the second radio resources occupy different radio resources; simultaneously performing bidirectional transmission of communication information with a user equipment through the first radio resources; and performing unidirectional transmission of communication information with the user equipment through the second radio resources.

According to another aspect, an embodiment of the present invention further provides a method for wireless communications, including:

acquiring first radio resources and second radio resources, where the first radio resources and the second radio resources occupy different radio resources; simultaneously performing bidirectional transmission of communication information with a base station through the first radio resources; and performing unidirectional transmission of communication information with the base station through the second radio resources.

According to still another aspect, an embodiment of the present invention further provides a base station, including:

a radio resource configuration unit, adapted to divide available radio resources in a communication system into first radio resources and second radio resources; and a first data transmission unit, adapted to simultaneously perform bidirectional transmission of communication information with a user equipment through the first radio resources, and perform unidirectional transmission of communication information with the user equipment through the second radio resources.

According to still another aspect, an embodiment of the present invention further provides a user equipment, including:

a radio resource acquiring unit, adapted to acquire first radio resources and second radio resources, where the first radio resources and the second radio resources occupy different radio resources; and a second data transmission unit, adapted to simultaneously perform bidirectional transmission of communication information with a base station through the first radio resources, and perform unidirectional transmission of communication information with the base station through the second radio resources.

In the method and the apparatus for wireless communications provided in the embodiments of the present invention, available radio resources in a communication system can be divided into first radio resources and second radio resources, a base station may perform bidirectional transmission of communication information with a UE on the first radio resources, and the base station may perform unidirectional transmission of communication information with the UE on the second radio resources. As the base station can perform only unidirectional transmission of communication information with the UE on the second radio resources, interference caused by simultaneously sending signals and receiving signals does not exist on same time frequency resources. Therefore, communication quality of communication information transmitted on the second radio resources is relatively high, and the second radio resources may be used to transmit relatively important communication information, so as to improve the communication quality. By adopting the method and the apparatus provided in the embodiments of the present invention, a common UE may perform transmission of communication information with the base station through the second radio resources, a new-version UE may perform bidirectional transmission of communication information with the base station through the first radio resources, so that the communication system can be compatible with the new-version UE and the common UE. More importantly, a transmission success rate of a relatively important communication signal can be ensured in communication processes, and the communication quality is improved.

BRIEF DESCRIPTION OF DRAWINGS

To illustrate the technical solutions according to the embodiments of the present invention more clearly, the accompanying drawings required for describing the embodiments are introduced below briefly. Apparently, the accompanying drawings in the following descriptions merely show some of the embodiments of the present invention, and persons of ordinary skill in the art can obtain other drawings according to the accompanying drawings without creative efforts.

DESCRIPTION OF EMBODIMENTS

The technical solutions of the present invention will be clearly described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

It should be understood that the technical solutions of the embodiments of the present invention may be applied in various communication systems, for example, a global system of mobile communication (Global System of Mobile communication, "GSM" for short), a code division multiple access (Code Division Multiple Access, "CDMA" for short) system, a wideband code division multiple access (Wideband Code Division Multiple Access, "WCDMA" for short) system, a general packet radio service (General Packet Radio Service, "GPRS" for short), a long term evolution (Long Term Evolution, "LTE" for short) system, an LTE frequency division duplexing (Frequency Division Duplex, "FDD" for short) system, an LTE time division duplexing (Time Division Duplex, "TDD" for short) system, a universal mobile telecommunication system (Universal Mobile Telecommunication System, "UMTS" for short), and a worldwide interoperability for microwave access (Worldwide Interoperability for Microwave Access, "WiMAX" for short) communication system, and the like.

It should be further understood that, in the embodiments of the present invention, a user equipment (User Equipment, "UE" for short) may be referred to as a terminal (Terminal), a mobile station (Mobile Station, "MS" for short), a mobile terminal (Mobile Terminal), or the like, and the user equipment may communicate with one or more core networks through a radio access network (Radio Access Network, "RAN" for short). For example, the user equipment may be a mobile phone (or be referred to as a "cellular" phone), a computer with a mobile terminal, or the like, or may further be a portable, pocket-sized, hand-held, computer built-in, or vehicle-mounted mobile apparatus, which exchanges voice and/or data with the radio access network.

In the embodiments of the present invention, a base station may be a base station (Base Transceiver Station, "BTS" for short) in GSM or CDMA, may further be a base station (NodeB, "NB" for short) in WCDMA, and may further be an evolutional base station (Evolutional Node B, "ENB or e-NodeB" for short) in LTE, which is not limited in the present invention. For ease of description, the following embodiments are described by using a base station eNB and a user equipment UE as an example.

Embodiment 1

Figure 1:
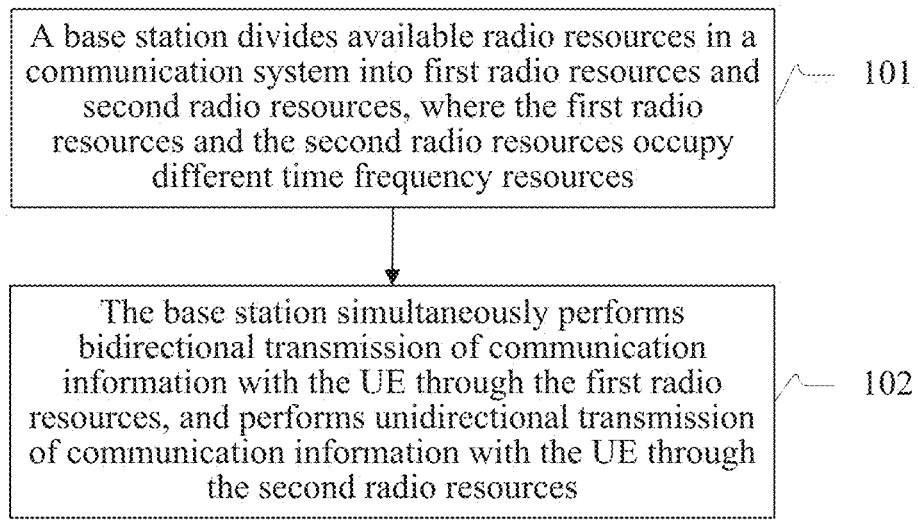
FIG. 1 is a schematic flowchart of a method for wireless communications according to Embodiment 1 of the present invention.

An embodiment of the present invention provides a method for wireless communications. As shown in FIG. 1, the method includes the following steps:

101. A base station divides available radio resources in a communication system into first radio resources and second radio resources, where the first radio resources and the second radio resources occupy different time frequency resources, the first radio resources are used for the base station to simultaneously perform bidirectional transmission of communication information with a UE, and the second radio resources are used for the base station to perform unidirectional transmission of communication information with the UE.

It should be noted that the UE in the embodiment of the present invention may be a UE supporting the advanced full duplex communication technology, and may further be a UE that does not support the advanced full duplex communication technology.

For the UE supporting the advanced full duplex communication technology (UE of a new version), a certain technical means (for example, antennas are properly arranged on the UE so that signals from multiple transmitting antennas are eliminated by each other at a receiving antenna, or a known signal transmitted by a transmitting circuit is used in a receiving circuit to perform interference cancellation and the like) is adopted to reduce co-channel interference between receiving and sending of signals by the user equipment, so that the UE can simultaneously perform bidirectional transmission of communication information with the base station on specified time frequency resources.

For the UE that does not support the advanced full duplex communication technology (common UE), unidirectional transmission of communication information with the base station may be performed through the second radio resources, and if necessary, unidirectional transmission of communication information with the base station may further be performed through the first radio resources, so as to ensure the compatibility of the UE in the communication system.

102. The base station simultaneously performs bidirectional transmission of communication information with the UE through the first radio resources, and performs unidirectional transmission of communication information with the UE through the second radio resources.

The first radio resources support bidirectional information transmission between the base station and the UE. For randomly given first radio resources, the base station may receive information from and send information to a same UE or different UEs. For example, on given first radio resources, the base station may separately receive information from and send information to different UEs that do not support the advanced full duplex communication technology.

It should be noted that, on the second radio resources, the base station can perform only unidirectional transmission of communication information with the UE, so that interference caused by simultaneously sending signals and receiving signals does not exist on same time frequency resources, and transmission quality of the communication information is relatively high. Preferably, the base station may transmit relatively important communication information in some communication processes with the UE on the second radio resources, so as to ensure the communication quality. Specifically, the relatively important communication information includes at least one type of information in a synchronization signal, a broadcast message, a reference signal, a random access message, and physical layer control signaling. In addition to the relatively important communication information, the base station may further transmit data packets with the UE on the second radio resources.

In the method for wireless communications provided in the embodiment of the present invention, available radio resources in a communication system can be divided into first radio resources and second radio resources, a base station may perform bidirectional transmission of communication information with a UE on the first radio resources, and the base station may perform unidirectional transmission of communication information with the UE on the second radio resources. On the second radio resources, the base station can perform only unidirectional transmission of communication information with the UE, so interference caused by simultaneously sending signals and receiving signals does not exist on same time frequency resources, therefore, communication quality of communication data transmitted on the second radio resources is relatively high, and the second radio resources may be used to transmit relatively important communication information, so as to improve the communication quality. By adopting the method provided in the embodiment of the present invention, a common UE may perform transmission of communication information with the base station through the second radio resources, a new-version UE may perform bidirectional transmission of communication information with the base station through the first radio resources, so that the communication system can be compatible with different UEs. More importantly, a transmission success rate of a relatively important communication signal can be ensured in communication processes, and the communication quality is improved.

Embodiment 2

Figure 2:
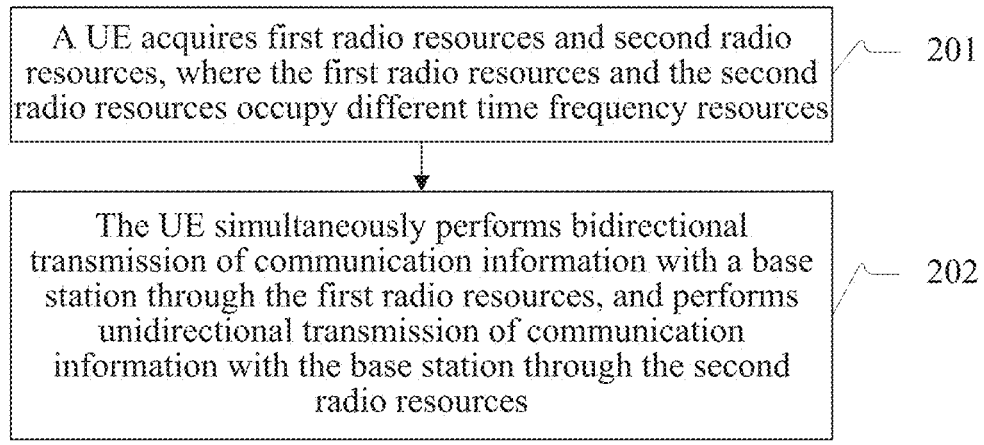
FIG. 2 is a schematic flowchart of a method for wireless communications according to Embodiment 2 of the present invention.

An embodiment of the present invention provides a method for wireless communications. As shown in FIG. 2, the method includes the following steps:

201. A UE acquires first radio resources and second radio resources, where the first radio resources and the second radio resources occupy different time frequency resources, the first radio resources are used for the current UE to simultaneously perform bidirectional transmission of communication information with a base station, and the second radio resources are used for the current UE to perform unidirectional transmission of communication information with the base station.

It should be noted that the UE in the embodiment of the present invention is a UE supporting the advanced full duplex communication technology, that is, a certain technical means (reference may be made to Embodiment 1 for the specific technical means) is adopted to reduce co-channel interference between receiving and sending of signals by the user equipment, so that the user equipment can simultaneously perform bidirectional transmission of communication information with the base station on specified time frequency resources.

202. The UE simultaneously performs bidirectional transmission of communication information with the base station through the first radio resources, and performs unidirectional transmission of communication information with the base station through the second radio resources.

It should be noted that, when the UE performs unidirectional transmission of communication information with the base station on the second radio resources, interference caused by simultaneously sending signals and receiving signals does not exist on same time frequency resources, so that transmission quality of the communication information is relatively high. Preferably, the UE may transmit relatively important communication information in some communication processes with the base station on the second radio resources, so as to ensure the communication quality. Specifically, the relatively important communication information includes at least one type of information in a synchronization signal, a broadcast message, a reference signal, a random access message, and physical layer control signaling. In addition to the relatively important communication information, the base station may further transmit data packets with the UE on the second radio resources.

In the method for wireless communications provided in the embodiment of the present invention, a UE can acquire first radio resources and second radio resources, and perform bidirectional transmission of communication information with a base station on the first radio resources, thereby effectively improving a utilization rate of spectrum resources; and further perform unidirectional transmission of communication information with the base station on the second radio resources, so that interference caused by simultaneously sending signals and receiving signals does not exist on same time frequency resources, communication quality of communication information transmitted on the second radio resources is relatively high, and the second radio resources may be used to transmit relatively important communication information, so as to improve the communication quality. By adopting the method provided in the embodiment of the present invention, on the premise of improving the utilization rate of spectrum resources, a transmission success rate of important communication signals in communication processes is also ensured, and the communication quality is improved.

Embodiment 3

Figure 3:
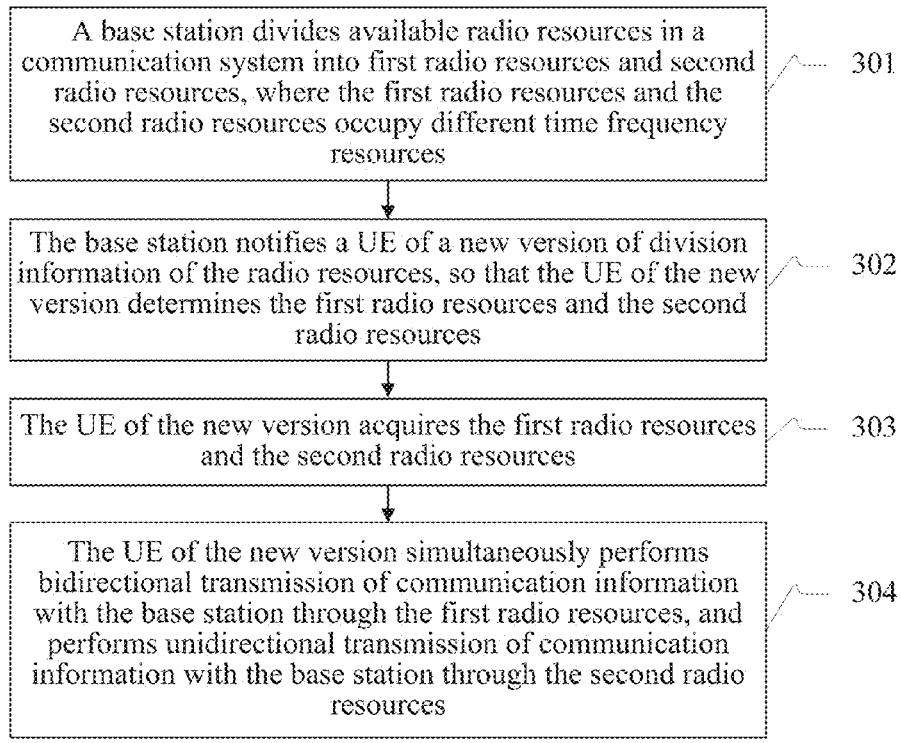
FIG. 3 is a schematic flowchart of a method for wireless communications according to Embodiment 3 of the present invention.

An embodiment of the present invention provides a method for wireless communications. As shown in FIG. 3, the method includes the following steps:

301. A base station divides available radio resources in a communication system into first radio resources and second radio resources, where the first radio resources and the second radio resources occupy different time frequency resources, the first radio resources are used for the base station to simultaneously perform bidirectional transmission of communication information with a user equipment, and the second radio resources are used for the base station to perform unidirectional information transmission with the user equipment.

The first radio resources and the second radio resources are time frequency resources that do not mutually overlap.

When the base station performs unidirectional transmission of communication information with the UE on the second radio resources, interference caused by simultaneously sending and receiving of signals does not exist on same time frequency resources, so that transmission quality of the communication information is relatively high. Preferably, the base station may transmit relatively important communication information in some communication processes with the UE on the second radio resources, so as to ensure the communication quality. Specifically, the relatively important communication information includes at least one type of information in a synchronization signal, a broadcast message, a reference signal, a random access message, and physical layer control signaling.

For ease of understanding, in the embodiment of the present invention, the UE is divided into a new-version UE and a common UE according to whether the advanced full duplex communication technology is supported, where the new-version UE is a UE supporting the advanced full duplex communication technology, that is, a certain technical means is adopted to reduce co-channel interference between receiving and sending of signals by the UE, so that the UE can simultaneously perform bidirectional transmission of communication information with the base station on specified time frequency resources; and the common UE does not support the advanced full duplex communication technology, that is, does not support bidirectional transmission of communication information simultaneously performed with the base station on the specified time frequency resources.

For ease of understanding, an LTE system is used as an example for description in the embodiment of the present invention.

In the LTE system, available radio resources in a communication system are mainly divided from two dimensions, that is, a time domain and a frequency domain, and a base station may divide the radio resources by adopting, but not limited to, the following methods:

(1) The base station divides the available radio resources in the communication system in the time domain, to obtain the first radio resources and the second radio resources, where the first radio resources and the second radio resources occupy different sub-frames; or (2) the base station divides the available radio resources in the communication system in the frequency domain, to obtain the first radio resources and the second radio resources, where the first radio resources and the second radio resources occupy different frequency resources.

Specifically, if the base station adopts the method (1) to divide the radio resources in the time domain, for a specific method, refer to the following description.

For an FDD (Frequency Division Duplexing, frequency division duplexing) system, the base station may pre-configure a part of sub-frames in 10 sub-frames in a radio frame into full duplex sub-frames FD. For a downlink frequency band of the FDD system, remaining sub-frames in the radio frame are configured into downlink sub-frames DL, used for the base station to send data to a UE; or for an uplink frequency band of the FDD system, remaining sub-frames in the radio frame are configured into uplink sub-frames UL, used for the base station to receive data sent by the UE.

For a TDD system, the base station may pre-configure a part of sub-frames in 10 sub-frames in a radio frame into full duplex sub-frames FD, and configure remaining sub-frames in the radio frame into downlink sub-frames DL and/or uplink sub-frames UL and/or flexible sub-frames. The flexible sub-frame may be dynamically used as an uplink sub-frame or a downlink sub-frame as required by a link in each transmission moment.

Figure 4:
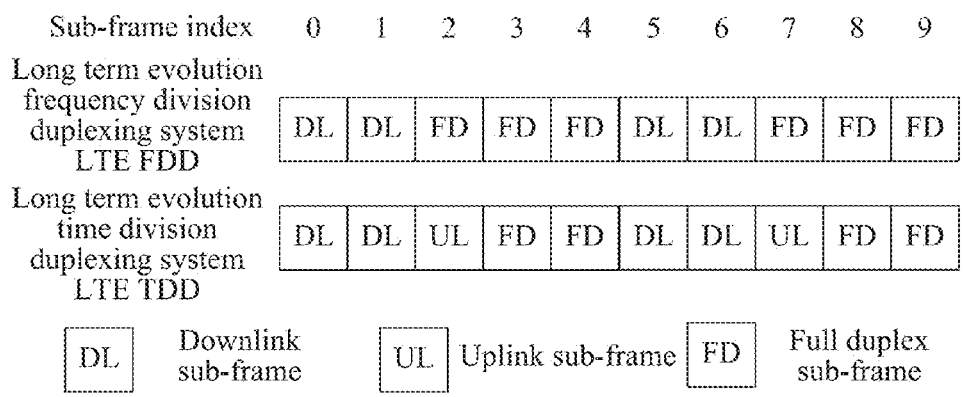
FIG. 4 and FIG. 5 are schematic diagrams of division of radio resources according to Embodiment 3 of the present invention.

Specifically, as shown in FIG. 4, in the downlink frequency band of the LTE FDD system, the base station pre-configures sub-frames 0, 1, 5, and 6 in each radio frame into downlink sub-frames DL, and pre-configures remaining sub-frames into full duplex sub-frames FD; and in the LTE TDD system, the base station pre-configures sub-frames 0, 1, 5, and 6 in each radio frame into downlink sub-frames DL, pre-configures sub-frames 2 and 7 into uplink sub-frames UL, and pre-configures remaining sub-frames into full duplex sub-frames FD. It should be noted that, in the LTE TDD system, sub-frame 1 is referred to as a special sub-frame, and sub-frame 6 may also be a special sub-frame. In the present invention, if not stated particularly, the special sub-frame is generally processed as a downlink sub-frame.

Specifically, if the base station adopts the method (2) to divide the radio resources in the frequency domain, for a specific method, refer to the following description.

Figure 5:
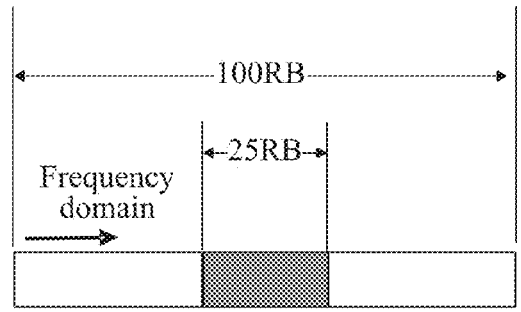

The LTE system is used as an example, where a system bandwidth is 20 MHz, and 100 RBs (Resources Block, resources block) are included. The base station may use 25 RBs in the middle of the system bandwidth as the second radio resources, and the remaining 75 RBs as the first radio resources. For a specific division situation, reference may be made to FIG. 5.

Obviously, the base station may further divide the radio resources in both the time domain and the frequency domain, so as to obtain the first radio resources and the second radio resources. That is to say, the first radio resources and the second radio resources occupy different resources in at least one dimension of the time domain and the frequency domain. For example, 25 RBs in the middle of sub-frames 0, 1, 5, and 6 are used as the second radio resources, and all the remaining radio resources are used as the first radio resources.

It should be noted that, in addition to the foregoing methods for dividing radio resources, the base station and the UE may, according to a provision of a preset protocol, automatically mark radio resources for transmitting preset specified communication information as the second radio resources. The specified communication information may be relatively important communication information, including a synchronization signal, a broadcast message, a reference signal, a random access message, physical layer control signaling, and the like, in some communication processes, so as to ensure a transmission success rate of the relatively important communication information. For example, in the preset protocol, it may provide that radio resources for transmitting a synchronization signal and a broadcast message are the second radio resources, and a base station cannot receive communication information sent by a UE. In this case, if the first radio resources and the second radio resources are obtained by division in the time domain only, both the base station and the UE may automatically mark a sub-frame (namely, sub-frames 0, 1, 5, and 6 for the LTE system) where the synchronization signal and the broadcast message are located as the second radio resources; and if the first radio resources and the second radio resources are obtained by division in the frequency domain only, both the base station and the UE may automatically mark a frequency band (namely, 6 RBs in the middle of the system bandwidth for the LTE system) where the synchronization signal and the broadcast message are located as the second radio resources.

After the radio resources for transmitting the specified communication information are automatically marked as the second radio resources according to the provision of the protocol, remaining radio resources may all be automatically marked as the first radio resources, and may also be further divided by the base station into the first radio resources and the second radio resources. For example, in the standard protocol, it may provide that radio resources for transmitting reference signals are the second radio resources, and both the base station and the UE may automatically mark radio resources other than the radio resources for transmitting the reference signal as the first radio resources; or the base station divides sub-frames 3, 4, 8, and 9 in each radio frame into full duplex sub-frames in the time domain, and in this case, if the radio resources for transmitting the reference signals exist in sub-frames 3, 4, 8, and 9, this part of radio resources are still the second radio resources.

Alternatively, if the communication system is a system of other types (for example, a 3G communication system, a WiMAX system, or an MIMO (Multiple-Input Multiple-Out-put, multiple-input multiple-out-put) system), the radio resources may, in addition to being distributed in the time domain and the frequency domain, further be distributed in a code domain or a space domain, and the radio resources may be divided in the corresponding dimension. For example, the radio resources are divided in the code domain, or the radio resources are divided in the space domain, so as to obtain the corresponding first radio resources and second radio resources. The first radio resources and the second radio resources occupy different resources in at least one dimension.

Preferably, the base station may configure uplink idle resources on the first radio resources, where the UE cannot transmit an uplink signal on the uplink idle resources, that is, the uplink idle resources are used for the base station to send relatively important downlink communication information to the UE, so as to ensure communication quality. For different UEs, the base station may configure same uplink idle resources, or different uplink idle resources. The base station may send configuration information of the uplink idle resources to the UE through a broadcast message or dedicated signaling. For example, on the first radio resources, when UE1 suffers strong interference from UE2, the base station may configure time frequency resources, which is occupied when sending a downlink reference signal to UE1, as uplink idle resources of UE2, where UE2 cannot send an uplink signal on the uplink idle resources, so as to reduce interference on UE1. Specifically, for UE2, if the radio resources allocated to UE2 for transmitting an uplink signal includes the radio resources allocated to UE1 for transmitting a downlink signal, as these resources belongs to the uplink idle resources, UE2 does not send the uplink signal; and for UE1, if the radio resources allocated to UE1 for transmitting an uplink signal includes the radio resources allocated to UE1 for transmitting a downlink signal, UE1 either does not send the uplink signal on the radio resources for receiving the downlink signal.

Alternatively, in addition to be differentiated on time frequency resources, a reference signal may be further differentiated through different code resources. For example, an uplink reference signal uses a ZC (Zadoff-Chu, Zadoff-Chu) sequence in a LTE system, and through an allocation of different ZC root sequences or different cyclic shifts of a same ZC root sequence, uplink reference signals of multiple cells or multiple UEs are multiplexed to same time frequency resources in a code division multiplexing manner, so that the reference signal may also be transmitted by using the first radio resources. If different UEs are allocated with same time frequency resources for transmitting reference signals (including reference signals from different user equipments, different types of reference signals from a same user equipment, or the like), the UEs need to be allocated with different code resources. Considering that the code domain orthogonality between ZC sequences of different root sequences is poorer than the code domain orthogonality between different cyclic shifts of the ZC sequence of a same root sequence, if at least one downlink reference signal and at least one uplink reference signal are allocated with same time frequency resources, and the reference signal adopts a ZC sequence, different cyclic shifts of the same ZC root sequence are preferably allocated to the downlink reference signal and the uplink reference signal.

The base station notifies the new-version UE of division information of the radio resources, so that the new-version UE determines the first radio resources and the second radio resources.

Specifically, the base station may notify the new-version UE of the division information of the radio resources through a broadcast message or dedicated signaling, where the dedicated signaling includes radio resource control RRC (Radio Resource Control, radio resource control) signaling, or physical downlink control channel PDCCH (Physical Downlink Control Channel, physical downlink control channel) signaling and the like.

Preferably, if the base station notify the new-version UE of the division information of the radio resources through the dedicated signaling, the base station may notify different new-version UEs of same division information of radio resources or different division information of radio resources, which is not limited here.

Further, the TDD (Time Division Duplexing, time division duplexing) system is used as an example. The base station may send different sub-frame configuration information to different new-version UEs through the dedicated signaling when notifying the new-version UE of the division information of the radio resources, so that the UEs that receive the sub-frame configuration information determine a usage of each sub-frame during interaction with the base station.

Specifically, the base station may indicate the usage of each sub-frame in the radio frame through dedicated RRC (Radio Resource Control, radio resource control) signaling, for example, indicate, through a bitmap (Bitmap) with a length being 10 bits, whether each sub-frame in the radio frame is a downlink sub-frame or an uplink sub-frame.

Figure 6:
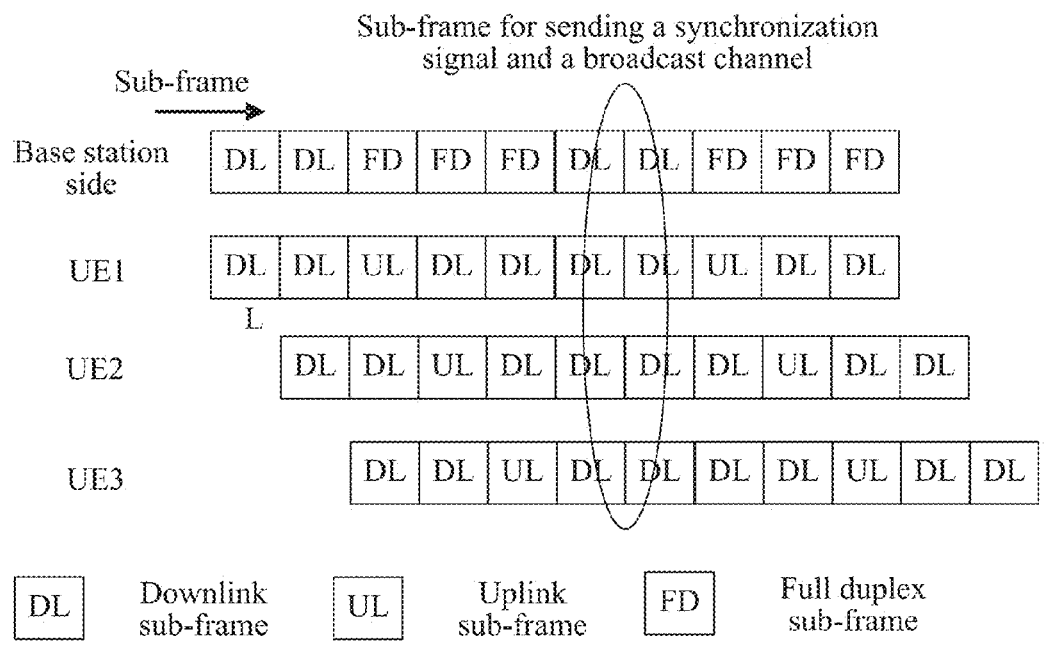
FIG. 6 is a schematic diagram showing that a base station notifies a UE of sub-frame distribution ratio information and radio frame header offset information in the method for wireless communications according to Embodiment 3 of the present invention.

The base station may further notify the new-version UE of sub-frame distribution ratio information and radio frame header offset information, for example, the base station may notify the user equipment of the sub-frame distribution ratio information through a broadcast message or dedicated RRC signaling, and notify the user equipment of the radio frame header offset information through the dedicated RRC signaling. As shown in FIG. 6, sub-frame configuration used at the base station side is {DL, DL, FD, FD, FD, DL, DL, FD, FD, FD}, sub-frame configuration notified to UE1, UE2, and UE3 is {DL, DL, UL, DL, DL, DL, DL, UL, DL, DL}; and in addition, the radio frame header offset information notified by the base station to UE1, UE2, and UE3 is no offset, one sub-frame delayed relative to the base station, and two sub-frames delayed relative to the base station, respectively. In the example shown in FIG. 6, the base station may send a synchronization signal and a broadcast channel to the new-version UE by carrying the synchronization signal and the broadcast channel in sub-frames 0, 1, 5, and 6, and the new-version UE may, when detecting the synchronization signal and the broadcast channel, further acquire the sub-frame distribution ratio information and the radio frame header offset information that are notified by the base station to the UE, so as to acquire the usage of each sub-frame. According to FIG. 6 which shows that the base station notifies the user equipment of the sub-frame distribution ratio information and the radio frame header offset information, uplink sub-frames of different new-version UEs may be staggered. Considering that the user equipment sends physical uplink control information on the uplink sub-frame to the base station, the user equipment may send physical uplink control information of all users in the system in different sub-frames, so as to further reduce interference.

Alternatively, for a communication system with a high system bandwidth, available carrier resources of the system may be further divided into a first carrier and a second carrier, and the notified sub-frame distribution ratio information and radio frame header offset information may be used to make the first carrier always have a transmission direction opposite to that of the second carrier at a same time. For example, a communication system has two carriers both with a bandwidth of 20 MHz, if the first carrier and the second carrier are simultaneously configured to a UE, sub-frame configuration information of the first carrier notified to the UE may be used to make any sub-frame in a radio frame be an uplink sub-frame on the second carrier if the any sub-frame is a downlink sub-frame on the first carrier and be a downlink sub-frame on the second carrier if the any sub-frame is an uplink sub-frame on the first carrier. It should be noted that the radio frame headers of the first carrier and the second carrier may be not aligned but have a certain offset so that the first carrier always has a transmission direction opposite to that of the second carrier on each sub-frame. By using the method, each sub-frame in the radio frame is an uplink sub-frame on one carrier and is a downlink sub-frame on another carrier, thereby simplifying timing design of a hybrid automatic retransmission request of data transmission.

303. The new-version UE acquires the first radio resources and the second radio resources.

Specifically, the new-version UE may receive, through a broadcast message or dedicated signaling, the division information of the radio resources sent by the base station, and acquire the first radio resources and the second radio resources according to the division information.

It should be noted that, in addition to acquiring the division information of the radio resources from the base station, the new-version UE may further acquire the division information of the radio resources through the following method:

The UE may, according to a provision of a preset protocol, automatically mark radio resources for transmitting preset specified communication information as the second radio resources, and mark remaining radio resources as the first radio resources. The specified communication information may be relatively important communication information, including a synchronization signal, a broadcast message, a reference signal, a random access message, physical layer control signaling, and the like, in some communication processes, so as to ensure a transmission success rate of the relatively important communication information. In this case, it may be considered that the division information of the radio resources notified by the base station is notified for radio resources other than the second radio resources that are automatically marked according to the provision of the preset protocol. For example, in the standard protocol, it may provide that radio resources for transmitting a reference signal are the second radio resources, for the radio resources other than the radio resources for transmitting the reference signal, the base station divides sub-frames 3, 4, 8, and 9 in each radio frame into full duplex sub-frames in the time domain, and in this case, if the radio resources for transmitting the reference signal exists in sub-frames 3, 4, 8, and 9, this part of resources are still the second radio resources.

Preferably, the embodiment of the present invention further provides a method for the new-version UE to acquire the first radio resources and the second radio resources, and a specific implementation method is as follows:

The new-version UE marks, according to the provision of the preset protocol, the radio resources for transmitting the preset specified communication information as the second radio resources, where the specified communication information includes at least one type of communication information in a synchronization signal, a broadcast message, a reference signal, a random access message, and physical layer control signaling.

For radio resources for transmitting non-specified communication information, further division may be performed according to the division information of the radio resources acquired from the base station, so as to obtain the first radio resources and the second radio resources.

304. The new-version UE simultaneously performs bidirectional transmission of communication information with the base station through the first radio resources, and performs unidirectional transmission of communication information with the base station through the second radio resources.

It should be noted that, as the common UE does not adopt the interference cancellation means to reduce interference generated during receiving and sending of signals on same time frequency resources, that is, the common UE does not support bidirectional transmission of communication information simultaneously performed on the same time frequency resources, it is not required to notify the common UE of the division information of the radio resources, thereby reducing transmission of useless data amount and reducing transmission burden of the network. Obviously, the common UE may perform unidirectional transmission of communication information with the base station on the first radio resources and the second radio resources.

It should be noted that, as only unidirectional transmission of communication data is performed on the second radio resources, co-channel interference is not generated when the UE receives and sends data on the second radio resources, so that the communication quality is relatively high. The second radio resources are used for the base station to transmit relatively important communication information with the new-version UE and the common UE, and the relatively important communication information includes but is not limited to a synchronization signal, a broadcast message, a reference signal, a random access message, and physical layer control signaling.

The synchronization signal and the broadcast message are very important for the UE to access the base station for data communication. The synchronization signal is used for the UE to acquire synchronization and keep synchronized with a cell in time and the frequency domain, and acquire a cell identifier. The broadcast channel is used for the base station to broadcast system configuration information such as a system bandwidth of the cell to the UE.

A reference signal is generally used for channel measurement and channel assessment. As accuracy of the channel measurement and the channel assessment directly affects performance of receiving data, correct transmission of the reference signal is also important.

A random access message is used to initiate, after a UE selects a proper cell and resides in the cell, a random access process to access a base station to which the cell belongs. Only after uplink synchronization of a communication system can the random access message be scheduled by the communication system for transmitting uplink data.

During data transmission between the base station and the UE, it is required to carry scheduling information of transmitted data in physical layer control signaling, so as to control resources and formats and the like used in the data transmission and ensure correct transmission of communication data. For example, an acknowledgment message is a type of common physical layer control signaling. In wireless communications, a data receiver needs to send a data sender an acknowledgment message used to determine whether data is correctly received; and if the acknowledgment message is not sent successfully, it leads the data sender to re-send the data, causing waste of radio resources.

In the method for wireless communications provided in the embodiment of the present invention, a UE of a new version can acquire first radio resources and second radio resources from a base station according to a preset protocol, perform bidirectional transmission of communication information with the base station on the first radio resources, and perform unidirectional transmission of communication information with the base station on the second radio resources. Further, as on the second radio resources, the base station can perform only unidirectional transmission of communication information with the UE, interference caused by simultaneously sending signals and receiving signals does not exist on same time frequency resources. Therefore, communication quality of communication information transmitted on the second radio resources is relatively high, and the second radio resources may be used to transmit relatively important communication information, so as to improve the communication quality. By adopting the method provided in the embodiment of the present invention, a common UE may perform transmission of communication information with the base station through the second radio resources, a new-version UE may perform bidirectional transmission of communication information with the base station through the first radio resources, so that the communication system can be compatible with the new-version UE and the common UE. More importantly, on the premise of improving a utilization rate of spectrum resources, a transmission success rate of a relatively important communication signal can be ensured in communication processes, and the communication quality is improved.

Embodiment 4

Figure 7:
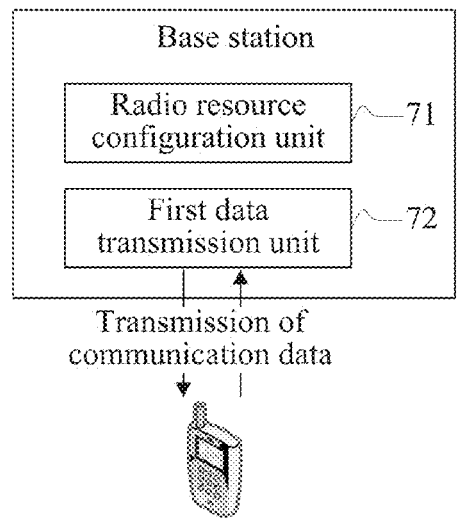
FIG. 7 and FIG. 8 are schematic structural diagrams of a base station according to Embodiment 4 of the present invention.

An embodiment of the present invention provides a base station, which can implement the method at the base station side in the foregoing method embodiments. As shown in FIG. 7, the base station includes:

a radio resource configuration unit 71, adapted to divide available radio resources in a communication system into first radio resources and second radio resources; and a first data transmission unit 72, adapted to simultaneously perform bidirectional transmission of communication information with a user equipment through the first radio resources, and perform unidirectional transmission of communication information with a common user equipment through the second radio resources.

Alternatively, the radio resource configuration unit 71 is further adapted to mark, according to a provision of a preset protocol, radio resources for transmitting preset specified communication information as the second radio resources, and mark remaining radio resources as the first radio resources. The specified communication information includes at least one type of information in a synchronization signal, a broadcast message, a reference signal, a random access message, and physical layer control signaling.

The second radio resources are used for the base station to transmit relatively important communication information with the user equipment, and the relatively important communication information includes at least one type of communication information in a synchronization signal, a broadcast message, a reference signal, a random access message, and physical layer control signaling.

Figure 8:
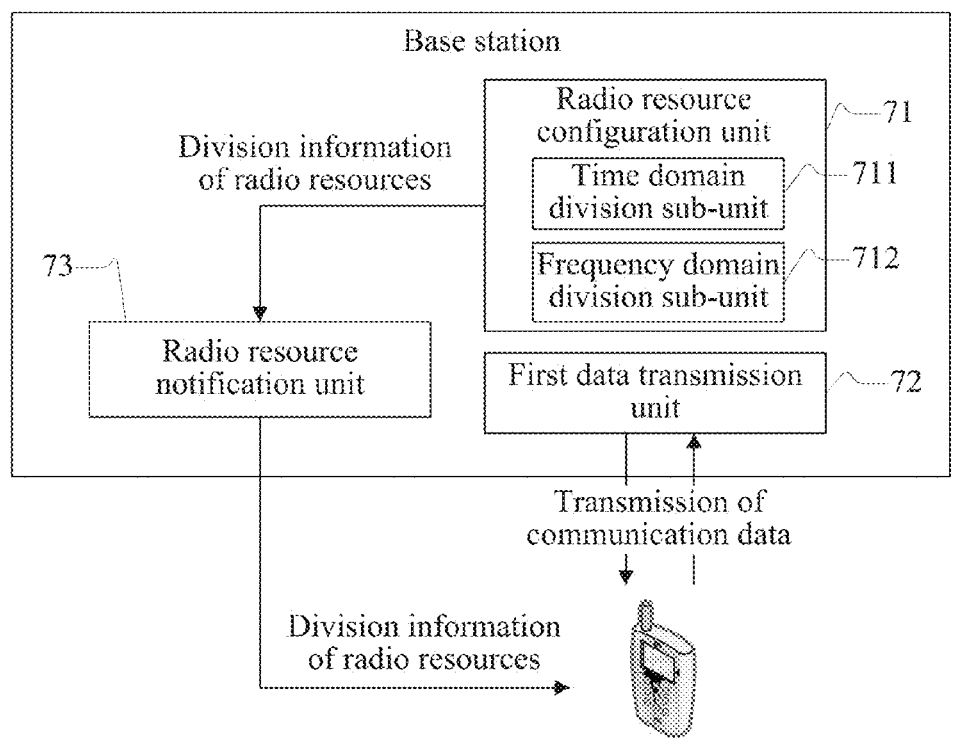

Specifically, the first radio resources and the second radio resources that are obtained by division performed by the radio resource configuration unit 71 occupy different resources in at least one dimension of a time domain and a frequency domain. As shown in FIG. 8, the radio resource configuration unit 71 includes a time domain division sub-unit 711 and/or a frequency domain division sub-unit 712, and the base station further includes a radio resource notification unit 73.

The time domain division sub-unit 711 is adapted to divide the available radio resources in the communication system in the time domain to obtain the first radio resources and the second radio resources, where the first radio resources and the second radio resources occupy different sub-frames.

The frequency domain division sub-unit 712 is adapted to divide the available radio resources in the communication system in the frequency domain to obtain the first radio resources and the second radio resources, where the first radio resources and the second radio resources occupy different spectrum resources.

The first radio resources obtained by division performed by the radio resource configuration unit 71 include at least one full duplex sub-frame, and the second radio resources include at least one downlink sub-frame, uplink sub-frame, or flexible sub-frame.

The radio resource notification unit 73 is adapted to notify the user equipment of division information of the radio resources, so that the user equipment determines the first radio resources and the second radio resources.

According to the base station shown in FIG. 8, the radio resource notification unit 73 is specifically adapted to notify the user equipment of the division information of the radio resources through broadcast information or dedicated signaling, so that the user equipment determines the first radio resources and the second radio resources, where the dedicated signaling includes radio resource control RRC signaling, medium access control layer MAC signaling, or physical downlink control channel PDCCH signaling.

Alternatively, the radio resource notification unit 73 is further adapted to send different sub-frame configuration information to different user equipments through dedicated signaling if the communication system is a time division duplexing TDD system, so that the user equipments that receive the sub-frame configuration information determine a usage of each sub-frame during interaction with the base station.

Alternatively, the radio resource configuration unit 71 is further adapted to configure uplink idle resources on the first radio resources, where the uplink idle resources are not capable of transmitting an uplink signal.

Alternatively, the radio resource configuration unit 71 is further adapted to allocate, in the first radio resources, different cyclic shifts of a root sequence of a same Zadoff-Chu sequence to a downlink reference signal and an uplink reference signal if at least one downlink reference signal and at least one uplink reference signal are allocated with same time frequency resources, and the reference signal adopts a form of a ZC (Zadoff-Chu, Zadoff-Chu) sequence.

In the base station provided in the embodiment of the present invention, a radio resource configuration unit 71 divides available radio resources in a communication system into first radio resources and second radio resources. The base station may perform bidirectional transmission of communication data with a UE on the first radio resources, and the base station may perform unidirectional transmission of communication data with the UE on the second radio resources. As the base station can perform only unidirectional transmission of communication information with the UE on the second radio resources, interference caused by simultaneously sending signals and receiving signals does not exist on same time frequency resources. Therefore, communication quality of communication data transmitted on the second radio resources is relatively high, and the second radio resources may be used to transmit relatively important communication information, so as to improve the communication quality. By adopting the base station provided in the embodiment of the present invention, a UE of a new version and a common UE can be compatible. More importantly, a transmission success rate of a relatively important communication signal can be ensured in communication processes, and the communication quality is improved.

Embodiment 5

Figure 9:
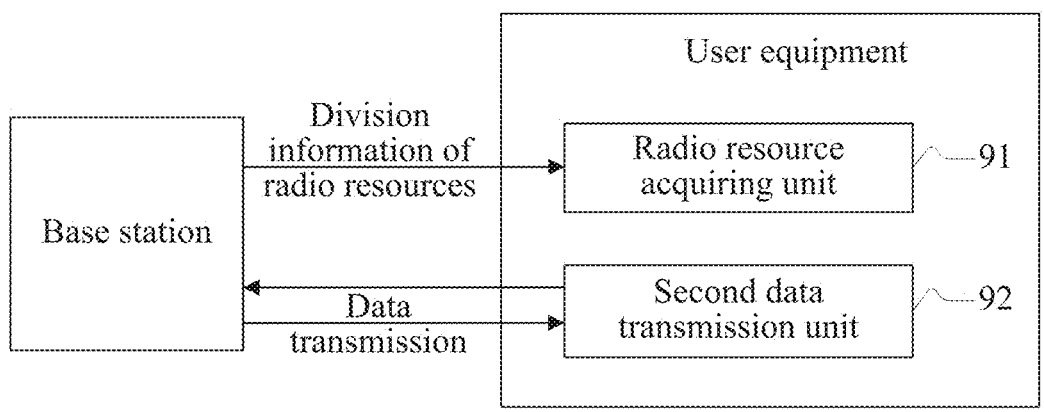
FIG. 9 is a schematic structural diagram of a user equipment according to Embodiment 5 of the present invention.

An embodiment of the present invention provides a user equipment, which can implement the method at the UE side in the foregoing method embodiments. As shown in FIG. 9, the user equipment includes:

a radio resource acquiring unit 91, adapted to acquire first radio resources and second radio resources, where the first radio resources and the second radio resources occupy different radio resources; and a second data transmission unit 92, adapted to simultaneously perform bidirectional transmission of communication information with a base station through the first radio resources, and perform unidirectional transmission of communication information with the base station through the second radio resources.

Alternatively, the radio resource acquiring unit 91 is specifically adapted to receive, through a broadcast message or dedicated signaling, division information of radio resources sent by the base station, and acquire the first radio resources and the second radio resources according to the division information. The first radio resources and the second radio resources occupy different resources in at least one dimension of a time domain and a frequency domain, and the dedicated signaling includes RRC signaling, medium access control layer MAC signaling, or physical downlink control channel PDCCH signaling.

If the first radio resources and the second radio resources that are acquired by the radio resource acquiring unit 91 are obtained by division in the time domain, the first radio resources and the second radio resources occupy different sub-frames.

If the first radio resources and the second radio resources that are acquired by the radio resource acquiring unit 91 are obtained by division in the frequency domain, the first radio resources and the second radio resources occupy different spectrum resources.

Alternatively, in addition to receiving, through the broadcast message or dedicated signaling, the division information of the radio resources sent by the base station, the radio resource acquiring unit 91 is further adapted to mark, according to a provision of a preset protocol, radio resources for transmitting preset specified communication information as the second radio resources, and mark remaining radio resources as the first radio resources, where the specified communication information includes at least one type of information in a synchronization signal, a broadcast message, a reference signal, a random access message, and physical layer control signaling.

Alternatively, the radio resource acquiring unit 91 is further adapted to mark, according to the provision of the preset protocol, the radio resources for transmitting the preset specified communication information as the second radio resources, further divide, according to the division information of the radio resources acquired from the base station, radio resources for transmitting non-specified communication information, and determine the first radio resources and the second radio resources, where the specified communication information includes at least one type of communication information in a synchronization signal, a broadcast message, a reference signal, a random access message, and physical layer control signaling.

Alternatively, the radio resource acquiring unit 91 is further adapted to acquire uplink idle resources configured on the first radio resources, where the uplink idle resources are not capable of transmitting an uplink signal.

The user equipment provided in the embodiment of the present invention can acquire first radio resources and second radio resources, perform bidirectional transmission of communication data with a base station on the first radio resources, and perform unidirectional transmission of communication data with the base station on the second radio resources. Further, as the base station can perform only unidirectional transmission of communication information with the UE on the second radio resources, interference caused by simultaneously sending signals and receiving signals does not exist on same time frequency resources. Therefore, communication quality of communication data transmitted on the second radio resources is relatively high, and the second radio resources may be used to transmit relatively important communication information, so as to improve the communication quality. By adopting the user equipment provided in the embodiment of the present invention, on the premise of improving a utilization rate of spectrum resources, a transmission success rate of a relatively important communication signal in communication processes can be ensured, and the communication quality is improved.

Figure 10:
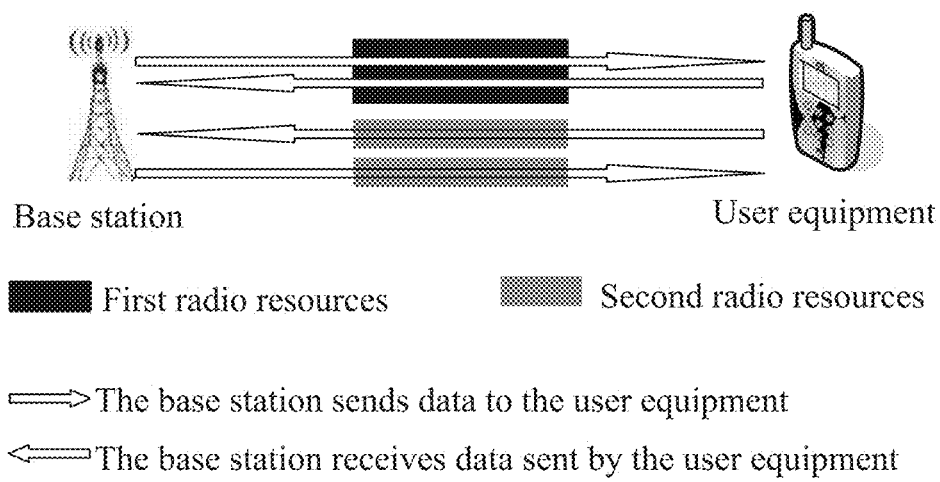
FIG. 10 is a schematic diagram of transmission of communication data in a system for wireless communications according to Embodiment 5 of the present invention.

The embodiment of the present invention further provides a system for wireless communications, including the base station shown in FIG. 7 or FIG. 8 and the user equipment shown in FIG. 9. As shown in FIG. 10, in the system for wireless communications, the base station and the user equipment simultaneously perform bidirectional transmission of communication data on the first radio resources, and perform unidirectional transmission of communication data on the second radio resources.

Through the foregoing description of the embodiments, persons skilled in the art may be clearly aware that the present invention may be accomplished in a manner of using software plus necessary universal hardware, and certainly may further be accomplished by hardware. However, in most cases, the former is a preferable implementation manner. Based on such an understanding, the technical solutions of the present invention or the part that makes contributions to the prior art can be substantially embodied in the form of a software product. The computer software product is stored in a readable storage medium, for example, a floppy disk, hard disk, optical disk of the computer, or the like, and contains several instructions used to instruct a computer device (may be a personal computer, a server, a network device, or the like) to perform the methods according to the embodiments of the present invention.

The foregoing descriptions are merely specific embodiments of the present invention, but not intended to limit the protection scope of the present invention. Any variation or replacement readily figured out by persons skilled in the art within the technical scope disclosed in the present invention shall fall within the protection scope of the present invention. Therefore, the protection scope of the present invention is subject to the protection scope of the appended claims.

What is claimed is:

1. A method for wireless communications, comprising:
   dividing, by a base station, available wireless radio resources in a communication system into first radio resources and second radio resources, wherein the first radio resources and the second radio resources are wireless radio resources occupying different wireless radio resources;
   simultaneously performing, by the base station, bidirectional transmission of communication information with a user equipment through the first radio resources; and
   performing, by the base station, unidirectional transmission of communication information with the user equipment through the second radio resources.

2. The method according to claim 1, wherein the dividing the available wireless radio resources in the communication system into the first radio resources and the second radio resources comprises:
   marking, according to a provision of a preset protocol, wireless radio resources for transmitting preset specified communication information as the second radio resources, and marking remaining wireless radio resources as the first radio resources, wherein the specified communication information comprises relatively important communication information;
   wherein the second radio resources are used for the base station to transmit the relatively important communication information with the user equipment, and the relatively important communication information comprises at least one type of communication information in a synchronization signal, a broadcast message, a reference signal, a random access message, and physical layer control signaling.

3. The method according to claim 2, further comprising:
   configuring uplink idle resources on the first radio resources, wherein the uplink idle resources are not capable of transmitting an uplink signal.

4. The method according to claim 2, further comprising:
   allocating, in the first radio resources, different cyclic shifts of a root sequence of a same Zadoff-Chu sequence to a downlink reference signal and an uplink reference signal if at least one downlink reference signal and at least one uplink reference signal are allocated with same time frequency resources, and the reference signal adopts a form of a Zadoff-Chu sequence.

5. The method according to claim 1, wherein
   the first radio resources and the second radio resources occupy different wireless resources in at least one dimension of a time domain and a frequency domain; and
   the dividing the available wireless radio resources in the communication system into the first radio resources and the second radio resources comprises:

dividing the available wireless radio resources in the communication system in the time domain to obtain the first radio resources and the second radio resources, wherein the first radio resources and the second radio resources occupy different sub-frames; and/or dividing the available wireless radio resources in the communication system in the frequency domain to obtain the first radio resources and the second radio resources, wherein the first radio resources and the second radio resources occupy different wireless spectrum resources.

6. A method for wireless communications, comprising:

receiving, by a user equipment, division information of wireless radio resources sent by a base station through a broadcast message or dedicated signaling;

acquiring, by the user equipment, first radio resources and second radio resources according to the received division information, wherein the first radio resources and the second radio resources are wireless radio resources occupying different wireless radio resources;

simultaneously performing, by the user equipment, bidirectional transmission of communication information with the base station through the first radio resources; and performing, by the user equipment, unidirectional transmission of communication information with the base station through the second radio resources.

7. The method according to claim 6, wherein the first radio resources and the second radio resources occupy different resources in at least one dimension of a time domain and a frequency domain, and the dedicated signaling comprises radio resource control RRC signaling, medium access control layer MAC signaling, or physical downlink control channel PDCCH signaling.

8. The method according to claim 6, wherein the acquiring the first radio resources and the second radio resources comprises:

marking, according to a provision of a preset protocol, radio resources for transmitting preset specified communication information as the second radio resources, and marking remaining radio resources as the first radio resources, wherein the specified communication information comprises at least one type of communication information in a synchronization signal, a broadcast message, a reference signal, a random access message, and physical layer control signaling.

9. The method according to claim 8, wherein the acquiring the first radio resources and the second radio resources further comprises:

marking, according to the provision of the preset protocol, the radio resources for transmitting the preset specified communication information as the second radio resources;

further dividing radio resources for transmitting non-specified communication information to determine the first radio resource and the second radio resources according to the received division information; and determining the first radio resources and the second radio resources, wherein the specified communication information comprises at least one type of communication information in the synchronization signal, the broadcast message, the reference signal, the random access message, and the physical layer control signaling.

10. A base station, comprising:

at least one memory storing computer-readable instructions; and at least one processor that executes the instructions to provide:

a radio resource configuration unit, adapted to divide available wireless radio resources in a communication system into first radio resources and second radio resources, wherein the first radio resources and the second radio resources are wireless radio resources occupying different wireless radio resources; and a first data transmission unit, adapted to simultaneously perform bidirectional transmission of communication information with a user equipment through the first radio resources, and perform unidirectional transmission of communication information with the user equipment through the second radio resources.

11. The base station according to claim 10, wherein the radio resource configuration unit is further adapted to mark, according to a provision of a preset protocol, radio resources for transmitting preset specified communication information as the second radio resources, and mark remaining radio resources as the first radio resources, wherein the specified communication information comprises relatively important communication information; wherein the second radio resource is used for the base station to transmit the relatively important communication information with the user equipment, and the relatively important communication information comprises at least one type of communication information in a synchronization signal, a broadcast message, a reference signal, a random access message, and physical layer control signaling.

12. The base station according to claim 11, wherein the radio resource configuration unit is further adapted to configure uplink idle resources on the first radio resources, wherein the uplink idle resources are not capable of transmitting an uplink signal.

13. The base station according to claim 11, wherein the radio resource configuration unit is further adapted to allocate, in the first radio resources, different cyclic shifts of a root sequence of a same Zadoff-Chu sequence to a downlink reference signal and an uplink reference signal if at least one downlink reference signal and at least one uplink reference signal are allocated with same time frequency resources, and the reference signal adopts a form of a Zadoff-Chu sequence.

14. A user equipment, comprising:

at least one memory storing computer-readable instructions; and at least one processor that executes the instructions to provide:

a radio resource acquiring unit, adapted to receive division information of wireless radio resources sent by a base station through a broadcast message or dedicated signaling, and to acquire first radio resources and second radio resources according to the received division information, wherein the first radio resources and the second radio resources occupy different wireless radio resources; and a second data transmission unit, adapted to simultaneously perform bidirectional transmission of communication information with a base station through the first radio resources, and perform unidirectional transmission of communication information with the base station through the second radio resources.

15. The user equipment according to claim 14, wherein the first radio resource and the second radio resources occupy different resources in at least one dimension of a time domain and a frequency domain, and the dedicated signaling comprises radio resource control RRC signaling, medium access control layer MAC signaling, or physical downlink control channel PDCCH signaling.

16. The user equipment according to claim 15, wherein
if the first radio resources and the second radio resources that are acquired are obtained by division in the time domain, the first radio resources and the second radio resources occupy different sub-frames; or
if the first radio resources and the second radio resources that are acquired by the radio are obtained by division in the frequency domain, the first radio resources and the second radio resources occupy different spectrum resources.

17. The user equipment according to claim 14, wherein the radio resource acquiring unit is further adapted to mark, according to a provision of a preset protocol, radio resources for transmitting preset specified communication information as the second radio resources, and mark remaining radio resources as the first radio resources, wherein the specified communication information comprises relatively important communication information, and the relatively important communication information comprises at least one type of communication information in a synchronization signal, a broadcast message, a reference signal, a random access message, and physical layer control signaling.

18. The user equipment according to claim 17, wherein the radio resource acquiring unit is further adapted to mark, according to the provision of the preset protocol, the radio resources for transmitting the preset specified communication information as the second radio resources, further divide radio resources for transmitting non-specified communication information to determine the first radio resource and the second radio resources according to the division information of the radio resources acquired from the base station, and determine the first radio resources and the second radio resources, wherein the specified communication information comprises at least one type of communication information in a synchronization signal, a broadcast message, a reference signal, a random access message, and physical layer control signaling.

* * * * *

UNITED STATES PATENT AND TRADEMARK OFFICE
CERTIFICATE OF CORRECTION

Page 1 of 1

PATENT NO. : 9,455,805 B2
APPLICATION NO. : 14/335165
DATED : September 27, 2016
INVENTOR(S) : Lei Wan et al.

It is certified that error appears in the above-identified patent and that said Letters Patent is hereby corrected as shown below:

In the Claims

Column 20, Line 64, Claim 15:
Delete "resource" and insert --resources--, therefor.

Signed and Sealed this
Twenty-first Day of March, 2017

Michelle K. Lee
*Director of the United States Patent and Trademark Office*